United States Patent
Yashwant Sawant et al.

(10) Patent No.: US 11,606,719 B2
(45) Date of Patent: Mar. 14, 2023

(54) APPLICATION IDENTIFICATION AND PATH SELECTION AT A WIRELESS ACCESS POINT FOR LOCAL NETWORK TRAFFIC BREAKOUT

(71) Applicant: Juniper Networks, Inc., Sunnyvale, CA (US)

(72) Inventors: Digambar Yashwant Sawant, Bengaluru (IN); Bhagat Singh Mariappan, Bangalore (IN); Harmeet Singh, Bangalore (IN); Rahul Chandra Khali, Bangalore (IN); Prateek Halwe, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/031,802

(22) Filed: Sep. 24, 2020

(65) Prior Publication Data

US 2022/0095165 A1 Mar. 24, 2022

(51) Int. Cl.
*H04W 28/10* (2009.01)
*H04L 45/74* (2022.01)
*H04W 76/12* (2018.01)

(52) U.S. Cl.
CPC ............. *H04W 28/10* (2013.01); *H04L 45/74* (2013.01); *H04W 76/12* (2018.02)

(58) Field of Classification Search
CPC ........ H04W 28/10; H04W 76/12; H04L 45/74
See application file for complete search history.

(56) References Cited

U.S. PATENT DOCUMENTS

| 8,112,800 | B1 | 2/2012 | Yang et al. |
| 8,612,612 | B1 | 12/2013 | Dukes et al. |
| 9,083,740 | B1 | 7/2015 | Ma et al. |
| 9,398,043 | B1 | 7/2016 | Yang |

(Continued)

FOREIGN PATENT DOCUMENTS

| CN | 105471748 B | 3/2019 | |
| CN | 109314903 B | * 1/2021 | ............ H04W 36/12 |

OTHER PUBLICATIONS

Extended Search Report from counterpart European Application No. 20213861.6, dated Jun. 4, 2021, 29 pp.

(Continued)

*Primary Examiner* — Eunsook Choi
(74) *Attorney, Agent, or Firm* — Shumaker & Sieffert, P.A.

(57) ABSTRACT

A wireless access point comprises a memory; and one or more processors operably coupled to the memory configured to: receive a first packet for an application; configure an initial packet flow for the application including a first forwarding action to send traffic for the application via a tunnel path; learn the application of the first packet; generate, based on a policy of the application, an entry in an application server address cache specifying an address of the application server and a second forwarding action to send traffic for the application via a local breakout path; receive a second packet for the application; and configure, in response to determining that a destination address of the second packet matches the entry in the application server address cache, a subsequent packet flow for the application including the second forwarding action to send traffic for the application via the local breakout path.

17 Claims, 5 Drawing Sheets

(56) References Cited

U.S. PATENT DOCUMENTS

| | | | |
|---|---|---|---|
| 10,063,451 B2 | 8/2018 | Chaubey | |
| RE48,434 E * | 2/2021 | Shahar | H04L 45/70 |
| 2007/0255852 A1* | 11/2007 | McBride | H04L 67/02 |
| | | | 709/246 |
| 2012/0224566 A1* | 9/2012 | O'Leary | H04W 28/04 |
| | | | 370/338 |
| 2015/0372904 A1* | 12/2015 | Navon | H04L 45/38 |
| | | | 709/238 |
| 2019/0261260 A1* | 8/2019 | Dao | H04W 48/18 |
| 2020/0120475 A1* | 4/2020 | Gupta | H04W 8/06 |

OTHER PUBLICATIONS

U.S. Appl. No. 16/946,997 entitled, "Dynamic Prediction and Management of Application Service Level Agreements," filed Jul. 14, 2020.

Response to Extended Search Report dated Jun. 4, 2021, from counterpart European Application No. 20213861.6, filed Sep. 28, 2022, 23 pp.

* cited by examiner

APPLICATION IDENTIFICATION AND PATH SELECTION AT A WIRELESS ACCESS POINT FOR LOCAL NETWORK TRAFFIC BREAKOUT

TECHNICAL FIELD

This disclosure relates to computer networks, and more specifically, to access points of computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The packets are transmitted between the source device and destination device using intermediate network devices, such as access points, gateways, firewalls, switches, and routers. The destination device extracts the data from the packets and assembles the data into its original form.

In some examples, a source device, such as a wireless device, connects to an access point (otherwise referred to as "wireless access point") to connect to a wired computer network, such as an enterprise network, branch network, service provider network, home network, virtual private network (VPN), local area network (LAN), virtual LAN (VLAN), and the like. For example, the access point may receive application traffic from source devices and tunnel (e.g., using Generic Routing Encapsulation (GRE)) the application traffic to a gateway device of the enterprise network, which in turn sends the application traffic to the destination device, such as an application server.

SUMMARY

This disclosure describes techniques for application identification and application-based path selection at a wireless access point. For example, when an access point receives traffic for an application hosted on an application server, rather than tunneling all application traffic from the access point to a gateway device, the access point is configured to send traffic on a local breakout path or the tunnel based on an identification of a source application from which the traffic originated.

In accordance with the described techniques, a wireless access point comprises a cache storing one or more application server addresses and one or more forwarding actions for the application traffic. The cache is referred to herein as "application server address cache." The wireless access point uses the application server address cache to configure subsequent packet flows for the application and to configure the wireless access point to send the subsequent packet flows to the application server via a local breakout path or a tunnel path.

As one example, the wireless access point receives an initial packet for an application and configures a first packet flow (otherwise referred to herein as "initial packet flow" or "learning flow") for the application, e.g., by generating a flow entry for the first packet flow in a flow table. The flow entry may include one or more values of the packet header (e.g., source address, destination address, source port, destination port, protocol, etc.) used to identify subsequent packets associated with the first packet flow. The flow entry for the initial packet flow also includes a forwarding action to send the initial packet flow to the application server via a tunnel because the initial packet flow is, by default, tunneled to the gateway device that has established a communication session with the application server.

The wireless access point learns the application associated with the packet, for example, by sending the packet to a deep packet inspection (DPI) engine (e.g., internal or external to the wireless access point) and receiving classification information of the application (e.g., application name, application identifier, and/or application group/type). When the wireless access point receives the classification information of the application from the DPI engine, the wireless access point determines whether the wireless access point is configured with a policy for the application and, based on a policy for the application, configures an entry within an application server address cache including the application server address and a forwarding action (e.g., local breakout path) by which the wireless access point is to send application traffic. For example, the wireless access point may receive classification information for a video streaming application, and based on a policy for the video streaming application traffic specifying a forwarding action to send the traffic on a local breakout path, configures an entry within the application server address cache including the server address for the video streaming application (determined from the destination address of the packet) and the forwarding action.

The wireless access point uses the application server address cache to configure subsequent packet flows for the application and to configure the wireless access point to send the subsequent packet flows to the application server via the specified forwarding action. For example, the wireless access point may receive a subsequent packet for the application and, rather than sending the subsequent packet to the DPI engine, performs a lookup of the application server address cache to determine if the destination address of the subsequent packet matches an application server address stored in the application server address cache. If the destination address of the subsequent packet matches an application server address in the application server address cache, the wireless access point configures a second packet flow (otherwise referred to herein as "subsequent packet flow" or "breakout flow"), e.g., by generating a flow entry for the subsequent packet flow in the flow table. The flow entry for the subsequent packet flow includes a forwarding action to send application traffic associated with the subsequent packet flow to the application server via the local breakout path or tunnel path. For example, the application server address cache may store an address of a video streaming application server and a forwarding action to send the traffic for the video streaming application via a local breakout path. If the destination address of the subsequent packet matches the address of the video streaming application server in the application server address cache, wireless access point configures the subsequent packet flow with a forwarding action to send the video streaming application traffic via the local breakout path.

In this way, if the wireless access point receives application traffic associated with the initial packet flow (i.e., matches the match criteria of the flow entry for the initial packet flow), the wireless access point determines, from the forwarding action of the initial packet flow, that the wireless access point is to send the application traffic associated with the initial packet flow to the application server via the tunnel. If the wireless access point receives application traffic associated with the subsequent packet flow (i.e., matches the match criteria of the flow entry for the subsequent packet flow), the wireless access point determines, from the forwarding action of the subsequent packet flow, that the wireless access point is to send the application traffic associated with the subsequent packet flow to the application server via the local breakout path.

The techniques described in this disclosure may provide one or more technical advantages that realize at least one practical application. For example, by configuring the wireless access point to send certain application traffic (e.g., bandwidth-intensive applications) via a local breakout path, the wireless access point does not tunnel all application traffic to the gateway device of an enterprise network, which may reduce the load on the enterprise network. Moreover, an application address server including one or more addresses of the application server and one or more forwarding actions enables an wireless access point to select a path based on an application and not by protocol or port. Additionally, by configuring the wireless access point to send application traffic associated with the initial packet flow via the tunnel to the gateway device, which may have an existing communication session (e.g., Transmission Control Protocol (TCP) session) with the application server, the wireless access point avoids needing to establish a new communication session between the wireless access point and the application server.

In one example, this disclosure describes a method comprising: receiving, by a wireless access point, a first packet for an application provided by an application server; configuring, by the wireless access point, an initial packet flow for the application including a first forwarding action to send traffic for the application to the application server via a tunnel path; learning, by the wireless access point, the application of the first packet; generating, by the wireless access point and based on a policy of the application, an entry in an application server address cache specifying an address of the application server and a second forwarding action to send traffic for the application to the application server via a local breakout path; receiving, by the wireless access point, a second packet for the application; configuring, by the wireless access point and in response to determining that a destination address of the second packet matches the entry in the application server address cache, a subsequent packet flow for the application including the second forwarding action to send traffic for the application to the application server via the local breakout path.

In another example, this disclosure describes a wireless access point comprising: a memory; one or more processors operably coupled to the memory, wherein the one or more processors are configured to: receive a first packet for an application provided by an application server; configure an initial packet flow for the application including a first forwarding action to send traffic for the application to the application server via a tunnel path; learn the application of the first packet; generate, based on a policy of the application, an entry in an application server address cache specifying an address of the application server and a second forwarding action to send traffic for the application to the application server via a local breakout path; receive a second packet for the application; and configure, in response to determining that a destination address of the second packet matches the entry in the application server address cache, a subsequent packet flow for the application including the second forwarding action to send traffic for the application to the application server via the local breakout path.

In another example, this disclosure describes a non-transitory computer-readable storage medium storing instructions that when executed, cause one or more programmable processors of a wireless access point to: receive a first packet for an application provided by an application server; configure an initial packet flow for the application including a first forwarding action to send traffic for the application to the application server via a tunnel path; learn the application of the first packet; generate, based on a policy of the application, an entry in an application server address cache specifying an address of the application server and a second forwarding action to send traffic for the application to the application server via a local breakout path; receive a second packet for the application; configure, in response to determining that a destination address of the second packet matches the entry in the application server address cache, a subsequent packet flow for the application including the second forwarding action to send traffic for the application to the application server via the local breakout path.

The details of one or more examples are set forth in the accompanying drawings and the description below. Other features, objects, and advantages will be apparent from the description and drawings, and from the claims.

DETAILED DESCRIPTION

Figure 1:
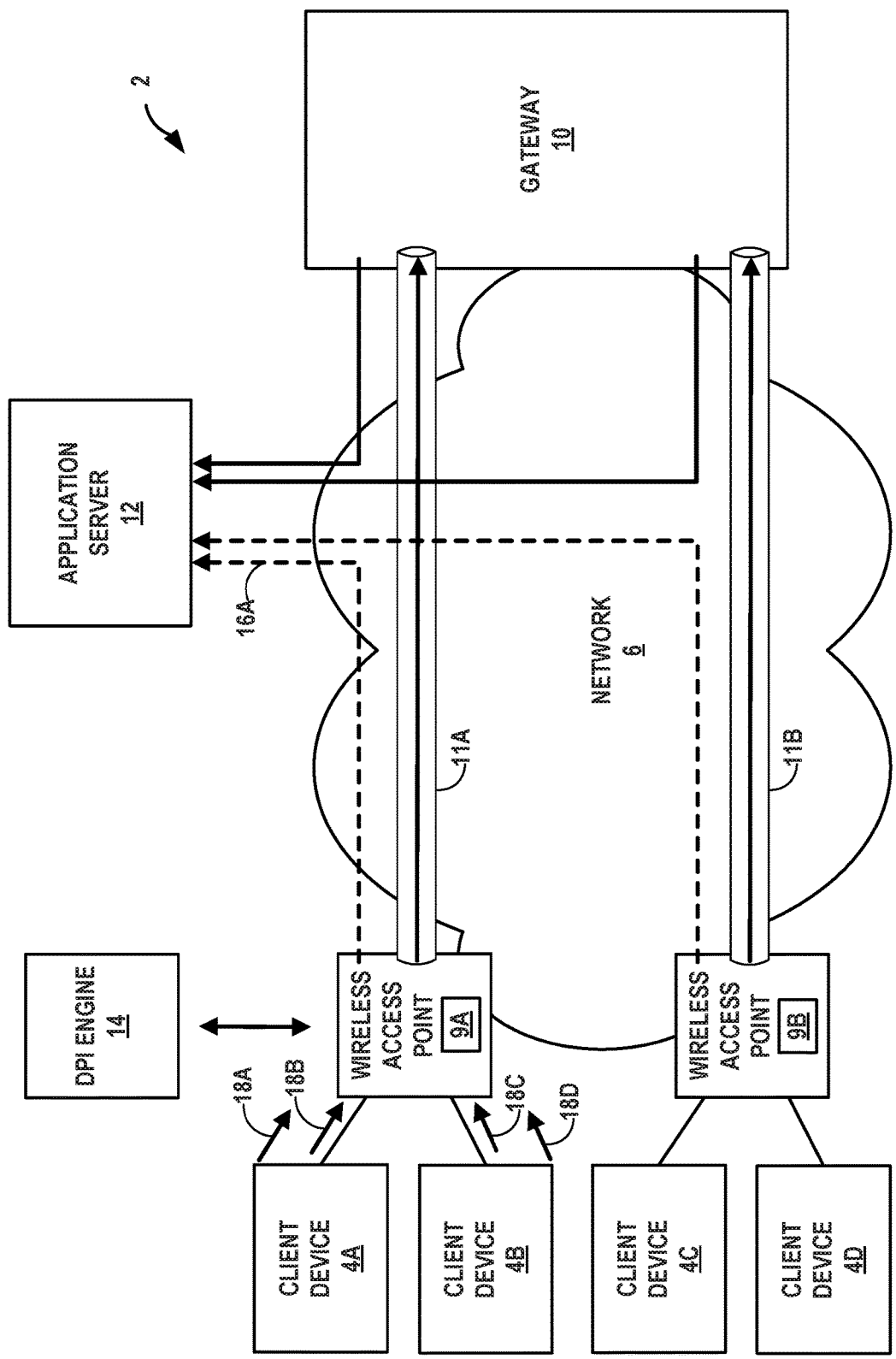
FIG. 1 is a block diagram illustrating an example network that provides application-identification and application-based path selection at a wireless access point, in accordance with the techniques described in this disclosure.

FIG. 1 is a block diagram illustrating an example network system 2 that provides application-identification and application-based path selection at one or more wireless access points 8, in accordance with the techniques described in this disclosure. In particular, FIG. 1 illustrates one example implementation of a network system 2 that includes a network 6 that provides client devices 4A-4D (collectively, "client devices 4") with access to application server 12 via wireless access points 8A-8B (collectively, "wireless access points 8") and/or gateway device 10.

In the example of FIG. 1, network 6 may represent a public network such as the Internet, a private network, such as those owned and operated by an enterprise or service provider, or a combination of both public and private networks that provides packet-based network services to client devices 4. As a result, network 6 may alternatively be referred to herein as a Service Provider (SP) network. Network 6 may include one or more Wide Area Networks (WANs), Local Area Networks (LANs), an enterprise LAN, Virtual Local Area Networks (VLANs), Virtual Private Networks (VPNs), and/or another type of network. Network system 2 may, for example, comprise a software-defined wide area network (SD WAN) managed by one or more software-defined networking (SDN) controllers. Further example details of an SD WAN network are described in U.S. application Ser. No. 16/946,997 entitled, "Dynamic Prediction and Management of Application Service Level Agreements," filed Jul. 14, 2020, the entire content of which is incorporated herein by reference.

In some examples, client devices 4 may connect to gateway device 10 via network 6 to receive connectivity to applications hosted by application server 12. Client devices 4 may be, for example, personal or laptop computers having, e.g., a wireless card, wireless-capable netbooks, mobile telephones, video game devices, smart phones, tablets, Internet of Things (IoT) devices, or other types of devices that access the applications hosted by application server 12. Each of client devices 4 may run a variety of software applications, such as word processing and other office support software, web browsing software, software to support voice calls, video games, videoconferencing, video streaming, and email, among others.

Gateway device 10 may be a router, firewall, or other network device to provide client devices 4 with access to services for applications hosted on application server 12 via network 6. Gateway device 10 redirects traffic flows to and from application server 12 that provide the services. For example, gateway device 10 may establish a communication session, e.g., TCP session, with application server 12. In the example of FIG. 1, gateway device 10 may be located in an enterprise network remote from wireless access points 8.

Client devices 4 may in some instances connect to wireless access points 8 to reach gateway device 10, which in turn accesses the applications hosted by application servers 12. Wireless access points 8 may connect wireless network devices, e.g., client devices 4, to a wired network (e.g., enterprise network) by tunneling traffic to a gateway device 10. In other words, client devices 4 may, in the example of FIG. 1, connect to the remote corporate server of the enterprise network via wireless access points 8 and gateway device 10. Wireless access points 8 may in some examples be configured with a forwarding state that specifies tunnel interfaces for tunneling application traffic between wireless access points 8 and gateway device 10 over network 6 using tunnels such as Internet Protocol (IP) or Generic Route Encapsulation (GRE) tunnels, Network Virtualization using GRE (NVGRE), or by using Virtual Local Area Networks (VLANs), Virtual Extensible LANs (VXLANs), Multiprotocol Label Switching (MPLS) techniques, and so forth. In the example of FIG. 1, wireless access point 8A may tunnel application traffic to gateway device 10 via tunnel 11A, and wireless access point 8B may tunnel application traffic to gateway device 10 via tunnel 11B.

In some examples, certain applications, such as video streaming or video conferencing applications, are bandwidth-intensive, while other applications, such as email applications, are less bandwidth-intensive. Tunneling all bandwidth-intensive application traffic to the gateway device of the remote enterprise network may increase the load on the enterprise network. While wireless access points may, in some examples, be configured with policies to send traffic on a local breakout path, these policies are typically based on protocols and/or ports and are unable to distinguish certain application traffic (e.g., distinguishing between email application traffic and video streaming application traffic).

In some examples, wireless access points 8 may send traffic to a deep packet inspection (DPI) engine, e.g., DPI engine 14, to identify a type of application that sourced a given packet flow. DPI engine 14 is illustrated as external to the wireless access point, but may alternatively be within the wireless access point. DPI engine 14 may need to process a plurality of packets before determining the application associated with the packets. In some examples, a wireless access point may initially tunnel packets to the gateway device prior to the DPI engine determining the application of the traffic, and switch to a local breakout path after determining the application of the packet flow. In these examples, the gateway device establishes communication session (e.g., TCP session) with the application server. By switching to the local breakout path for the packet flow, the application server will not accept the packet flow from the wireless access point without establishing a new communication session between the wireless access point and the application server. Further example details of DPI engines and application identification are described in U.S. Pat. No. 8,112,800, entitled "Multi-Layered Application Classification and Decoding," filed Nov. 8, 2007; U.S. Pat. No. 8,612,612, entitled "Dynamic Policy Control for Application Flow Processing in a Network Device," filed Sep. 28, 2011; U.S. Pat. No. 9,083,740, entitled "Network Traffic Pattern Matching Using Adaptive Deterministic Finite Automata," filed Sep. 28, 2009; U.S. Pat. No. 9,398,043, entitled "Applying Fine-Grain Policy Action to Encapsulated Network Attacks," filed Mar. 24, 2009; and U.S. Pat. No. 10,063,451, entitled "Providing Application Metadata Using Export Protocols in Computer Networks," filed Sep. 28, 2015, the content of each of which is incorporated herein by reference.

In accordance with the techniques described in this disclosure, wireless access points 8 may provide application-identification for packet flows from client devices 4 and, based on the identification for each packet flow, provide application-based path selection to send application traffic to application server 12. For example, wireless access points 8 may include application server address caches 9A-9B (collectively, "application server address caches 9"), respectively, that store one or more application server addresses and one or more forwarding actions, such as a local breakout path and a tunnel path. Wireless access points 8 may use the application server address caches 9 to configure subsequent packet flows for the application and to configure the wireless access points to send the subsequent packet flows to the application server via a local breakout path or a tunnel path.

As one example, wireless access point 8A receives, e.g., from client device 4A, an initial packet 18A for an application hosted on application server 12 and configures a first packet flow (otherwise referred to herein as an "initial packet flow" or "learning flow") for the application. The term "packet flow," "traffic flow," or simply "flow" refers to a set of packets originating from a particular source device (e.g., client device 4A) and sent to a particular destination device (e.g., application server 12). A single flow of packets, in either the upstream (sourced by one of client devices 4) or downstream (destined for one of client devices 4) direction, may be identified by values used in a header of a packet, e.g., source address, destination address, source port, destination port, protocol, source MAC address, destination MAC address, source interface, destination interface, etc.

Wireless access point 8A may configure the initial packet flow, for example, by generating a flow entry in a flow table. The flow entry for the initial packet flow may include one or more values of the packet header that are used to identify subsequent packets associated with the initial packet flow.

Wireless access point 8A may learn the application associated with packet 18A, for example, by sending the packet to a deep packet inspection (DPI) engine 14 and receiving from DPI engine 14 classification information of the application. In some examples, DPI engine 14 may not be able to classify the application until after processing a plurality of packets for a given application. Because DPI engine 14 is unable to classify the application for the initial packets of the initial packet flow, wireless access point 8 A is configured to tunnel application traffic associated with an initial packet flow to gateway device 10, which establishes a communication session (e.g., TCP session) with application server 12.

As one example, packet 18A may represent a packet for a video streaming application hosted on application server 12. In this example, wireless access point 8A may initially receive packet 18A and configure a flow entry for the initial packet flow with a forwarding action to send subsequent video streaming application traffic associated with the initial packet flow to application server 12 via tunnel 11A.

If wireless access point 8A receives subsequent application traffic associated with the initial packet flow, e.g., packet 18B, wireless access point 8A may tunnel packet 18B to gateway device 10 via tunnel 11A. For example, wireless access point 8A may determine that packet 18B matches the matching criteria (e.g., values from initial packet 18A header) stored in the flow entry for the initial packet flow. In response, wireless access point 8A sends packet 18B in accordance with the forwarding action of the flow entry for the initial packet flow, e.g., by tunneling packet 18B to gateway device 10 via tunnel 11A. In this way, wireless access point 8A may send application traffic associated with the initial packet flow (e.g., packets 18A and 18B) to application server 12 via tunnel 11A.

After DPI engine 14 determines the application, DPI engine 14 returns classification information of the application to wireless access point 8A. For example, DPI engine 14 may return an application name, an application identifier, and/or other details (e.g., metadata) of the application, such as application group/type (e.g., social networking, video streaming, etc.). In response to receiving the application classification information from DPI engine 14, wireless access point 8A determines whether wireless access point 8A is configured with a policy for the application. As further described below, the policy for the application may include an application name, an application identifier, and a forwarding action, such as to send application traffic on a local breakout path or a tunnel path.

As one example, wireless access point 8A may receive classification information associated with the video streaming application and determines if the classification information for the video streaming application matches a policy. In this example, application server 12 may be configured with a policy including a forwarding action to send video streaming application traffic via local breakout path 16A. In response to receiving the classification information associated with the video streaming application, wireless access point 8A may determine that the classification information matches the policy and generates an entry in application server address cache 9A with the address of application server 12 (e.g., determined from the destination address of a packet) and the associated forwarding action of the policy to send video streaming application traffic via local breakout path 16A.

When wireless access point 8A receives a subsequent packet, e.g., packet 18C, for the video streaming application hosted by application server 12, wireless access point 8A performs a lookup of application server address cache 9A, instead of sending the packet to DPI engine 14, to determine if the destination address of packet 18C matches an application server address stored in application server address cache 9A. If the destination address of packet 18C matches an application server address in application server address cache 9A, wireless access point 8A configures a second packet flow (otherwise referred to herein as "subsequent packet flow" or "breakout flow") for the application. For example, wireless access point 8A configures, based on the application server address cache 9A, a flow entry for the subsequent packet flow and the forwarding action to send the subsequent packet flow to application server 12 via local breakout path 16A.

When wireless access point 8A receives a subsequent packet associated with the subsequent packet flow, e.g. packet 18D, wireless access point 8A determines from the flow entry for the subsequent packet flow that the forwarding action is to send packet 18D to application server 12 via local breakout path 16A. For example, in response to determining that packet 18D matches the matching criteria (e.g., values of initial packet 18C header) stored in the flow entry for the subsequent packet flow, wireless access point 8A sends packet 18D to application server 12 via the local breakout path 16A.

Figure 2:
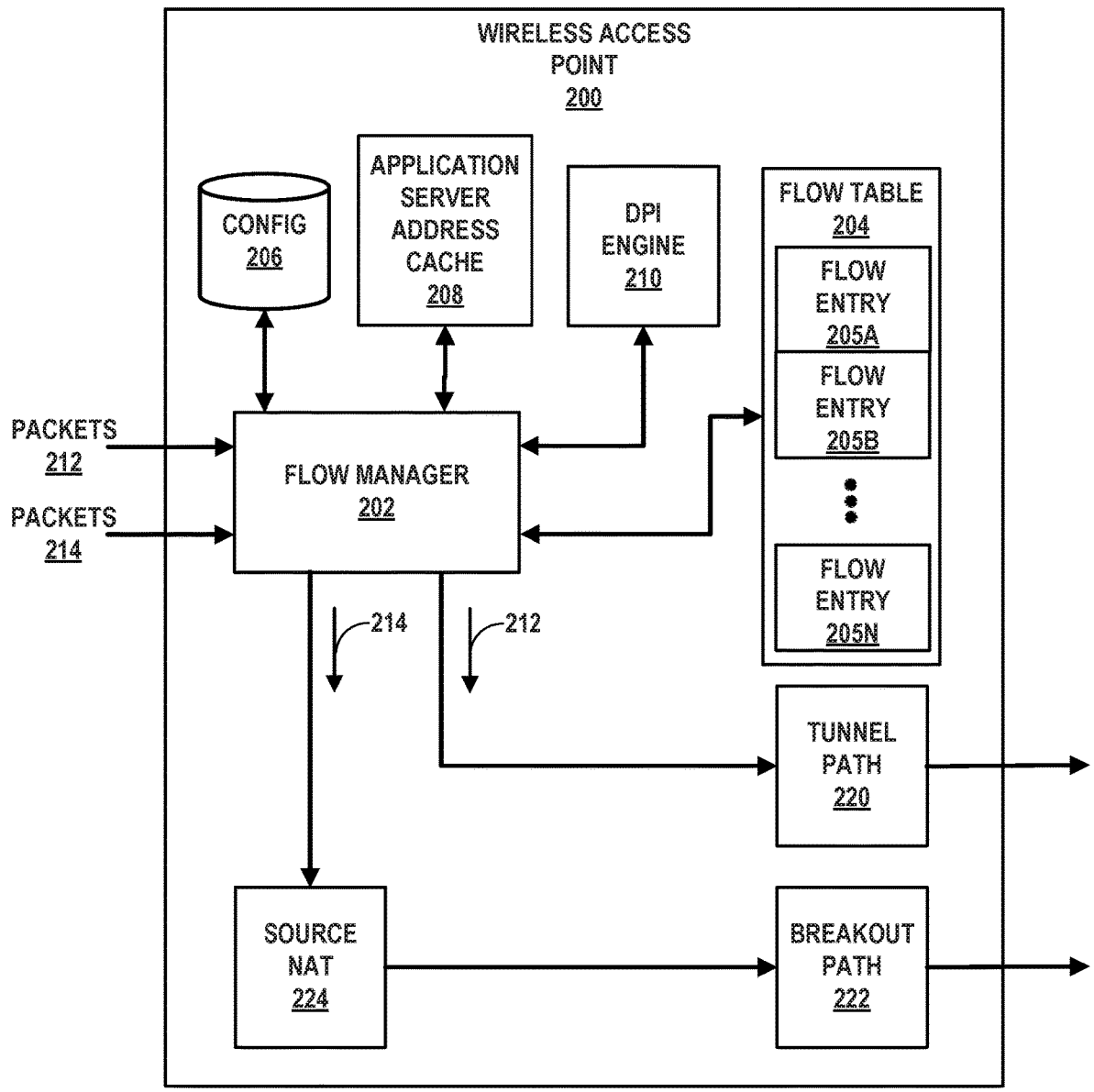
FIG. 2 is a block diagram illustrating an example implementation of the wireless access point in further detail, in accordance with the techniques described in this disclosure.

FIG. 2 is a block diagram illustrating an example implementation of the wireless access point in further detail, in accordance with the techniques described in this disclosure. For ease of illustration, wireless access point 200 is described with respect to wireless access point 8A of FIG. 1, but may represent any wireless access point in accordance with the techniques described in this disclosure. In the example of FIG. 2, wireless access point 200 includes a flow manager 202, a flow table 204, a policy configuration database 206, and an application server address cache 208. In the example of FIG. 2, wireless access point 200 may include DPI engine 210. Although wireless access point 200 in FIG. 2 includes DPI engine 210, DPI engine 210 may be external to wireless access point 200.

Flow manager 202 may configure packet flows for incoming packets 212 and 214 to send packets to an application server via a tunnel (e.g., tunnel path 220) or a local breakout path (e.g., path 222), respectively, based on the application associated with the packets. Packets 212 may represent packets 18A and 18B of FIG. 1, and packets 214 may represent packets 18C and 18D of FIG. 1.

In the example of FIG. 2, flow manager 202 may receive an initial packet, e.g., one of packets 212, for an application. Flow manager 202 configures a flow entry in flow table 204 (e.g., flow entry 205A) for an initial packet flow. For example, flow manager 202 stores one or more values used in a header of the packet, i.e., source address, destination address, source port, destination port, protocol, source MAC address, destination MAC address, source interface, destination interface, etc. Flow manager 202 may also include a forwarding action for flow entry 205A to send the initial packet flow to the application server via tunnel path 220. For example, flow entry 205A may include a forwarding action to send traffic destined for the application server out of an outgoing interface configured for the tunnel.

Flow manager 202 learns the application of the packet by sending the packet to DPI engine 210 and receiving from DPI engine 210 classification information of the application. For example, DPI engine 210 may determine the application (after processing a plurality of packets for the application), and returns classification information of the application, such as an application name, an application identifier, and/or other information such as application group/type.

In response to receiving the application classification information, flow manager 202 may determine if a policy exists for the application. For example, flow manager 202 may perform a lookup of policy configuration database 206 that stores one or more policies for applications. Policies may include an application name, an application identifier, and a forwarding action. A user may configure policies through an interface (not shown) of the wireless access point, such as a command-line interface, a graphical user interface, or the like. In some examples, wireless access point 200 may receive one or more policies from a controller. A policy may include an application name, application identifier, and a forwarding action, such as shown in the following example policies:

```
typedef struct app_policy_t {
  char app_name[64];
  uint32_t app_id;
  uint8_t. policy_action_path;
);
Entry 1:
  .app_name = "Video Streaming Application";
  .app_id = 53;
  .policy_action_path = LOCAL_BREAKOUT;
  .creation_time=2020001011100
Entry 2:
  .app_name = "Email Application";
  .app_id = 34;
  .policy_action_path = TUNNEL;
  .creation_time=2020001011200
```

In the above examples, a first policy entry includes an application name "Video Streaming Application," an application identifier "53," and a forwarding action specified as "LOCAL_BREAKOUT." The second policy entry includes an application name "Email Application," an application identifier "34," and a forwarding action specified as "TUNNEL." In some examples, each of the policies may include other information, such as application type or other application identifying information, a creation time of the entry, etc.

If a policy exists for the application (or application type), flow manager 202 may generate an entry in application server address cache 208 specifying an address of the application server hosting the application in application server address cache 208 and a forwarding action of a corresponding policy. For example, flow manager 202 may receive classification information including an application name of "video streaming application" and/or an application identifier of 53. Flow manager 202 determines whether a policy entry exists in policy configuration database 206 that includes an application name of "video streaming application," and/or an application identifier of 53. In this example, the first policy entry matches the application name and/or application identifier returned from DPI engine 210. In response to determining that the first policy entry matches the application name and/or application identifier returned from DPI engine 210, flow manager 202 generates an entry in application server address cache 208 specifying the address of the application server hosting the video streaming application (e.g., identified from destination IP address of a packet) and the forwarding action (e.g., local breakout path) specified in the first policy entry. Similarly, if flow manager 202 receives classification information including an application name of "email application" and/or an application identifier of 34. Flow manager 202 determines that the second policy entry exists in policy configuration database 206 that includes an application name of "email application" and/or an application identifier of 34. In response to determining that the second policy entry matches the application name and/or application identifier returned from DPI engine 210, flow manager 202 generates an entry in application server address cache 208 specifying the address of the application server hosting the email application (e.g., identified from destination IP address of a packet) and the forwarding action (e.g., tunnel path) specified in the second policy entry.

Application server address cache 208 may be located in the kernel memory of wireless access point 200. As further described below with respect to FIG. 3, application server address cache 208 may be implemented as a trie or other similar format.

When flow manager 202 receives a packet associated with a subsequent packet flow, e.g., one of packets 214, flow manager 202 may perform a lookup of application server address cache 208. If flow manager 202 determines, for example, that packet 214 has a destination address that matches an entry in application server address cache 208, flow manager 202 configures a flow entry, e.g., flow entry 205B, for the subsequent packet flow including the forwarding action to send packets 214 associated with the subsequent packet flow to the application server via local breakout path 222. For example, flow entry 205B may include a forwarding action to send traffic destined for the application server out of an outgoing interface configured for the local breakout path.

In this way, if wireless access point 200 receives a subsequent packet associated with the initial packet flow (e.g., one of packets 212), flow manager 202 may determine, from flow entry 205A for the initial packet flow, to send packet 212 to the application server via the tunnel path 220. This enables wireless access point 200 to continue to send application traffic of the initial packet flow via the tunnel to the gateway device that has a communication session already established with the application server, which avoids communication session issues that occur from switching to local breakout without establishing a new communication session between the wireless access point and the application server. Alternatively, or additionally, if wireless access point 200 receives a subsequent packet of the subsequent packet flow (e.g., one of packets 214), flow manager 202 may determine, from flow entry 205B for the subsequent packet flow, to send packet 214 to the application server via the local breakout path 222. In some examples, wireless access point 200 performs source Network Address Translation (NAT) 224 to map return packets from the application server to client devices and selects a default bridge interface to send the traffic to the intermediate network (e.g., network 6 of FIG. 1). Packets received at wireless access point 200 may be returned to a client device using source NAT 224 and wireless access point 200 may determine an appropriate interface (e.g., WLAN interface) to forward the packets back to the client device.

Figure 3:
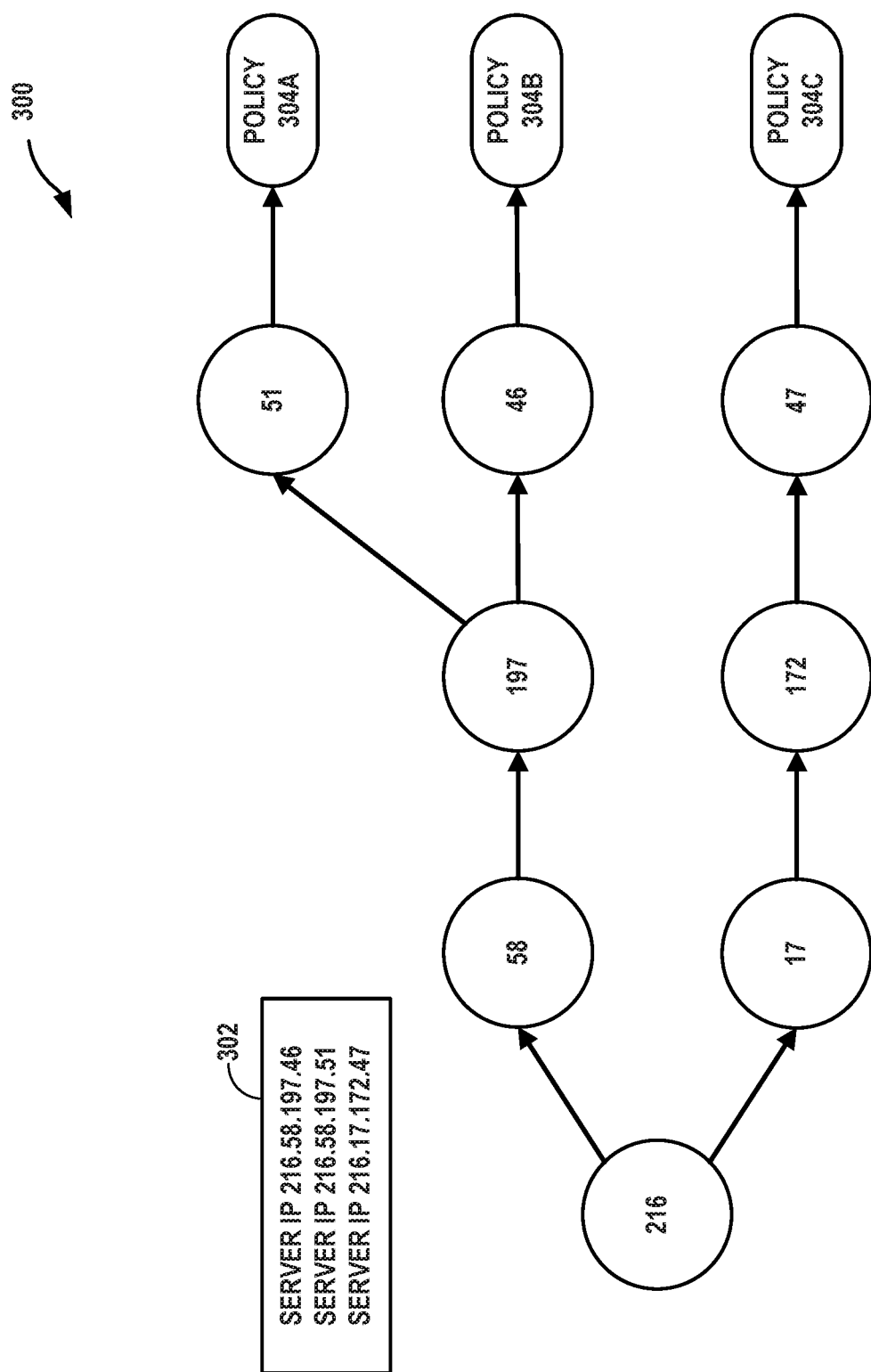
FIG. 3 is a conceptual diagram illustrating an example implementation of the application server address cache, in accordance with the techniques described in this disclosure.

FIG. 3 is a conceptual diagram illustrating an example implementation of the application server address cache, in accordance with the techniques described in this disclosure. Application server address cache 300 may represent an example implementation of application server address caches 9 of FIG. 1 and application server address cache 208 of FIG. 2.

In the example of FIG. 3, application server address cache 300 may be represented as a trie data structure. In this example, application server address cache 300 may store addresses of one or more application servers, e.g., application server addresses 302. In this example, the wireless access point may learn three application server addresses. A first application server address is 216.58.197.46 and may represent a first application server (e.g., video streaming server). A second application server address is 216.58.197.51 and may represent a second, different video application server. A third application server address is 216.17.172.47 and may represent a third application server (e.g., email server).

In the example of FIG. 3, the application server address cache 300 may be in the form of a trie data structure and is used to identify a corresponding policy, e.g., policy 304A-304C (collectively, "policies 304"), for an application server address. For example, policy 304A is to be applied to a packet flow with a destination address of 216.58.197.51. Similarly, policy 304B is to be applied to a packet flow with a destination address of 216.58.197.46. Likewise, policy 304C is to be applied to a packet flow with a destination address of 216.17.172.47. Policies 304 may be a forwarding action, such as to send the traffic on a local breakout path (e.g., local breakout path 222 of FIG. 2) or to send the traffic on a tunnel (e.g., tunnel path 220 of FIG. 2). In this example, policy 304A and policy 304B may include a forwarding action to send traffic of a first application (e.g., video streaming application) on a local breakout path, and policy 304C may include a forwarding action to send traffic of a second application (e.g., email application) on a tunnel path.

In this example, a wireless access point (e.g., via flow manager 202 of FIG. 2) may receive a packet including a destination address of 216.58.197.51 and perform a lookup of the application server address cache 300. The wireless access point may determine, in response to a lookup of the application server address cache 300, that policy 304A is to be applied to a packet destined for 216.58.197.51. As described above, policy 304A may include a forwarding action to perform local breakout. As such, the wireless access point may generate a flow entry in the flow table including values of the packet's header (e.g., source address, destination address, source port, destination port, protocol, etc.) and the forwarding action to perform local breakout. Similarly, the wireless access point may receive a packet including a destination address of 216.58.197.46 and perform a lookup of the application server address cache 300. The wireless access point may determine, in response to a lookup of the application server address cache 300, that policy 304B is to be applied to a packet destined for 216.58.197.46. As described above, policy 304B may include a forwarding action to perform local breakout. As such, the wireless access point may generate a flow entry in the flow table including values of the packet's header (e.g., source address, destination address, source port, destination port, protocol, etc.) and the forwarding action to perform local breakout. In this way, if the wireless access point receives traffic destined for either 216.58.197.46 or 216.58.197.51 (i.e., for video streaming traffic destined for a video streaming application server), the wireless access point may send the traffic to the application server via the local breakout path.

Alternatively, or additionally, the wireless access point may receive a packet including a destination address of 216.17.172.47 and perform a lookup of the application server address cache 300. The wireless access point may determine, in response to a lookup of the application server address cache 300, that policy 304C is to be applied to a packet destined for 216.17.172.47. As described above, policy 304C may include a forwarding action to tunnel the traffic. As such, the application server may generate a flow entry in the flow table including values of the packet's header (e.g., source address, destination address, source port, destination port, protocol, etc.) and the forwarding action to tunnel the traffic. In this way, if the wireless access point receives traffic destined for 216.17.172.47 (i.e., for email traffic destined for an email application server), the wireless access point may send the traffic to the application server via a tunnel path.

Figure 4A:
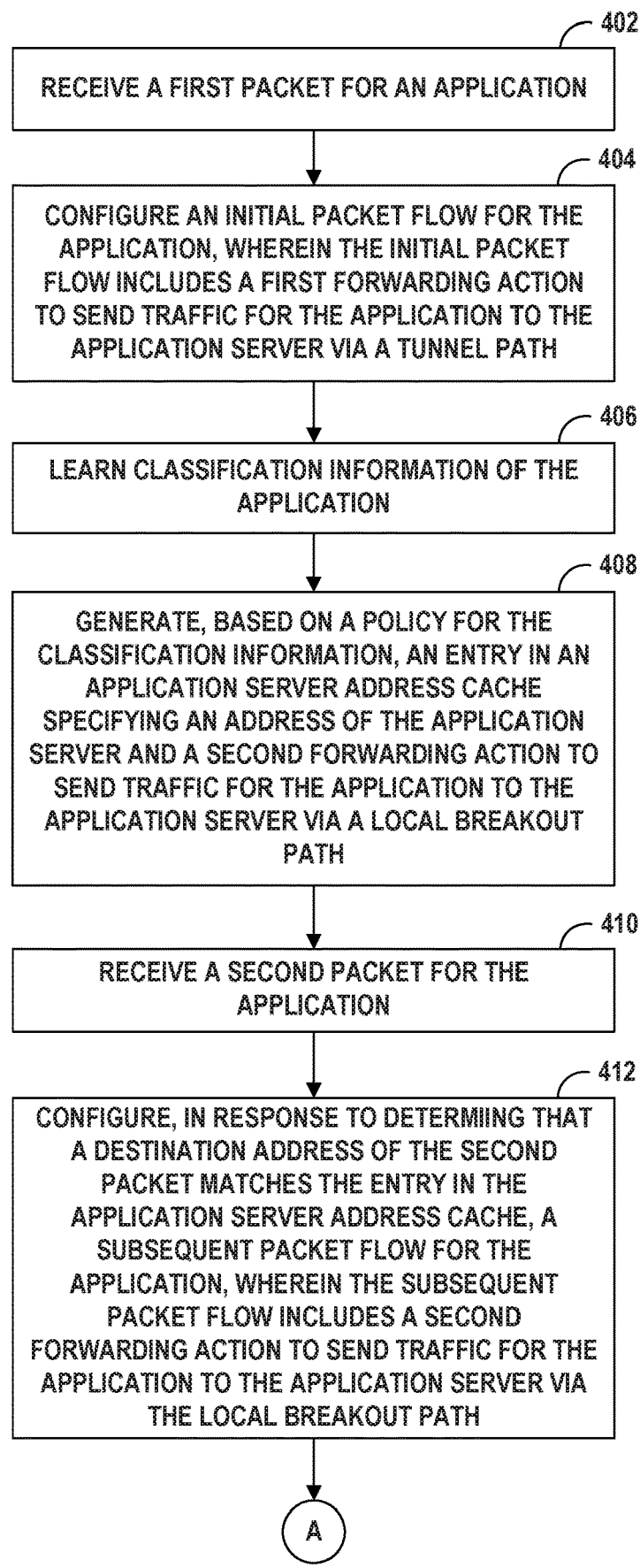
FIGS. 4A-4B are flowcharts illustrating an example operation of an application-based path selection at a wireless access point, in accordance with the techniques described in this disclosure.
Figure 4B:
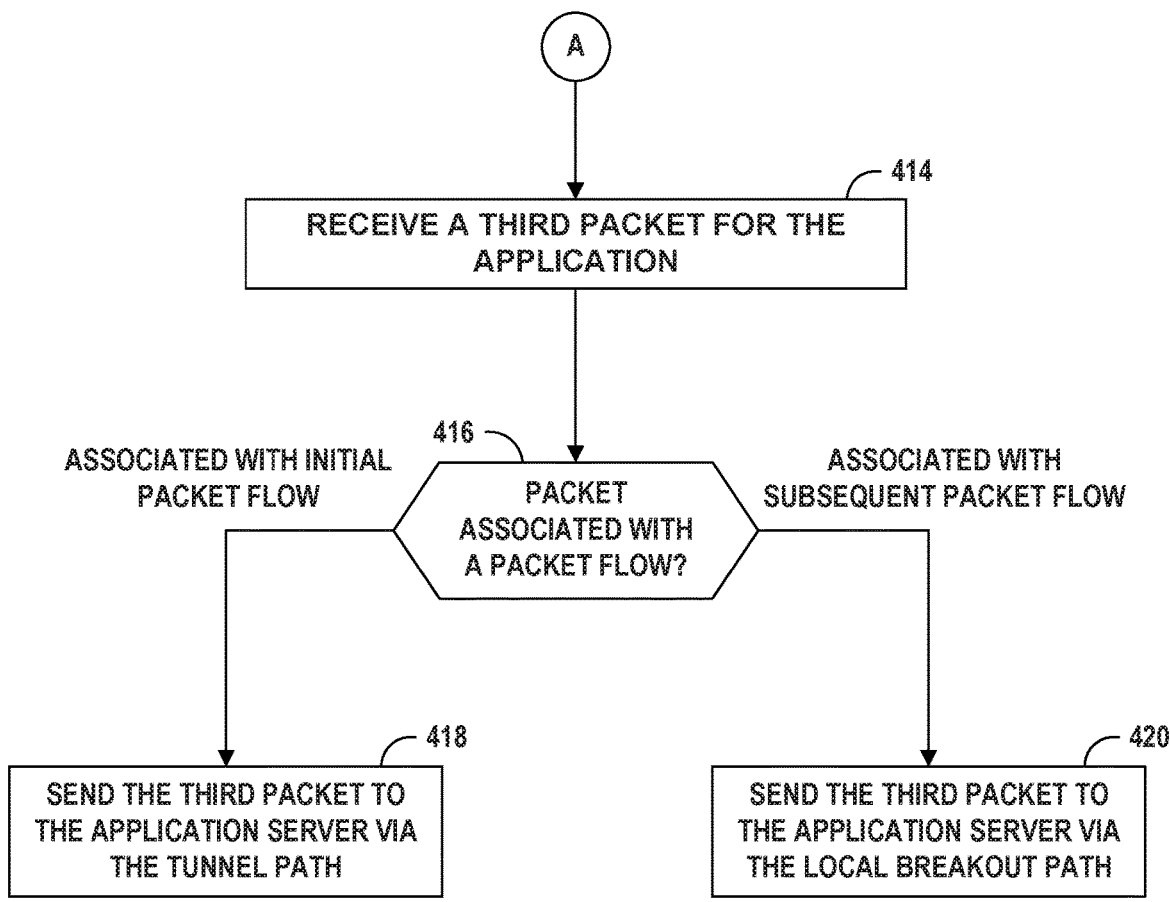

FIGS. 4A-4B are flowcharts illustrating an example operation of an application-based path selection at a wireless access point. For ease of illustration, FIGS. 4A-4B are described with respect to wireless access point 8A of FIG. 1 and wireless access point 200 of FIG. 2, but may represent the operation of any wireless access point.

In the example of FIG. 4A, wireless access point 8A may receive an initial packet ("first packet") from a client device (402), e.g., packet 18A from client device 4A. Flow manager 202 of wireless access point 8A configures an initial packet flow for the application including a first forwarding action to send traffic for the application to the application server via a tunnel path (404). For example, flow manager 202 generates a flow entry 205A in flow table 204 that includes one or more values of the header of the packet (e.g., source address, destination address, source port, destination port, protocol, source MAC address, destination MAC address, source interface, destination interface, etc.), and a first forwarding action to send traffic for the application to the application server via a tunnel path 220.

Wireless access point 8A then learns classification information of the application (406). For example, flow manager 202 of wireless access point 8A sends the packet to a DPI engine to determine the application of the packet, and receives from the DPI engine the classification information of the application such as an application name, an application identifier, and/or other information about the application such as an application group/type.

In response to receiving classification information of the application, flow manager 202 of wireless access point 8A generates an entry in application server address cache 208 based on a policy of the application (408). For example, wireless access point 8A may be configured with a policy for a video streaming application with a forwarding action to send traffic for the video streaming application via local breakout path 222. In response to receiving classification information for a video streaming application, flow manager 202 of wireless access point 8A may perform a lookup of policy configuration database 206 to determine if wireless access point 8A is configured with a policy for the video streaming application. For example, flow manager 202 determines whether the application name, application identifier, and/or other application information of the classification information returned from the DPI engine matches a policy in policy configuration database 206.

If wireless access point 8A determines that a policy exists for the video streaming application, wireless access point 8A may generate an entry specifying the address of the video streaming application server in application server address cache 208, which is determined from the destination address of the packet. Flow manager 202 of wireless access point 8A may also configure the entry in application server address cache 208 to specify the forwarding action from the policy (e.g., to send video streaming application traffic on local breakout path 222).

Wireless access point 8A uses the application server address cache 208 to configure subsequent packet flows for the application and to configure the wireless access point to send the subsequent packet flows to the application server via a local breakout path or a tunnel path. For example, wireless access point 8A receives a subsequent packet ("second packet") for the application (410). Flow manager 202 of wireless access point 8A determines whether a destination address of the subsequent packet matches the entry in application server address cache 208, and if there is a match, flow manager 202 configures a subsequent packet flow for the application including the forwarding action to send traffic for the application to the application server via local breakout path 222 (412). As one example, flow manager 202 may determine that the destination address of the packet that the address of the video streaming application server matches the address stored the application server address in application server address cache 208. Flow manager 202 of wireless access point 8A may also determine from application server address cache 208 the associated forwarding action for the application server address (e.g., to send video streaming application server via local breakout path 222). Using application server address cache 208, flow manager 202 of wireless access point 8A generates a flow entry 205B in flow table 204 that includes one or more values of the header of the second packet and the forwarding action ("second forwarding action") identified from the application server address cache 208. In this way, wireless access point 8A may send packets associated with the initial packet flow on tunnel path 220 and send packets associated with the subsequent packet flow on local breakout path 222 (as further illustrated in FIG. B).

For example, wireless access point 8A may receive a third packet for the application (414). Flow manager 202 of wireless access point 8A determines whether the packet is associated with the initial packet flow or with the subsequent packet flow (416). If the third packet is associated with the initial packet flow, flow manager 202 of wireless access point 8A sends the third packet to the application server via the tunnel path 220 (418). If the third packet is associated with the subsequent packet flow, flow manager 202 of wireless access point 8A sends the third packet to the application server via the local breakout path 222 (420). In some examples, flow manager 202 of wireless access point 8A performs source Network Address Translation (NAT) to map return packets to client devices and selects a default bridge interface to send the traffic to the intermediate network (e.g., network 8 of FIG. 1). Packets received at wireless access point 8A may be returned to a client device using source NAT and wireless access point 8A may determine an appropriate interface (e.g., WLAN interface) to forward the packets back to the client device.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A method comprising:
receiving, by a wireless access point, a first packet for an application provided by an application server;
configuring, by the wireless access point, an initial packet flow for the application including a first forwarding action to send traffic for the application to the application server via a tunnel path;
learning, by the wireless access point, the application of the first packet;
generating, by the wireless access point and based on a policy of the application, an entry in an application server address cache specifying an address of the application server and a second forwarding action to send traffic for the application to the application server via a local breakout path;
receiving, by the wireless access point, a second packet for the application;
configuring, by the wireless access point and in response to determining that a destination address of the second packet matches the entry in the application server address cache, a subsequent packet flow for the application including the second forwarding action to send traffic for the application to the application server via the local breakout path;
receiving, by the wireless access point, a third packet for the application; and
in response to determining the third packet is associated with the subsequent packet flow, sending, by the wireless access point and based on the second forwarding action, the third packet to the application server via the local breakout path.

2. The method of claim 1, further comprising:
receiving, by the wireless access point, a fourth packet for the application; and
in response to determining the fourth packet is associated with the initial packet flow, sending, by the wireless access point and based on the first forwarding action, the fourth packet for the application to the application server via the tunnel path.

3. The method of claim 1, wherein learning the application of the first packet comprises:
sending, by the wireless access point, the first packet to a deep packet inspection engine; and
receiving, by the wireless access point and from the deep packet inspection engine, classification information of the application.

4. The method of claim 1, wherein generating the entry in the application server address cache specifying the address of the application server comprises:
determining the address of the application server from the destination address of the first packet.

5. The method of claim 1, wherein the policy comprises:
at least one of the application name and the application identifier; and
the second forwarding action.

6. The method of claim 5, wherein generating the entry in the application server address cache specifying the second forwarding action comprises:
determining the second forwarding action from the policy.

7. A wireless access point comprising:
a memory;
one or more processors operably coupled to the memory, wherein the one or more processors are configured to:
receive a first packet for an application provided by an application server;
configure an initial packet flow for the application including a first forwarding action to send traffic for the application to the application server via a tunnel path;
learn the application of the first packet;
generate, based on a policy of the application, an entry in an application server address cache specifying an address of the application server and a second forwarding action to send traffic for the application to the application server via a local breakout path;
receive a second packet for the application;
configure, in response to determining that a destination address of the second packet matches the entry in the application server address cache, a subsequent packet flow for the application including the second forwarding action to send traffic for the application to the application server via the local breakout path;
receive a third packet for the application; and
in response to determining the third packet is associated with the subsequent packet flow, send, based on the second forwarding action, the third packet to the application server via the local breakout path.

8. The wireless access point of claim 7, wherein the one or more processors are further configured to:
receive a fourth packet for the application; and
in response to determining the fourth packet is associated with the initial packet flow, send, based on the first forwarding action, the fourth packet for the application to the application server via the tunnel path.

9. The wireless access point of claim 7, wherein, to learn the application of the first packet, the one or more processors are further configured to:
send the first packet to a deep packet inspection engine; and
receive, from the deep packet inspection engine, classification information of the application.

10. The wireless access point of claim 7, wherein, to generate the entry in the application server address cache specifying the address of the application server, the one or more processors are further configured to:
determine the address of the application server from the destination address of the first packet.

11. The wireless access point of claim 7, wherein the policy comprises:
at least one of the application name and the application identifier; and
the second forwarding action.

12. The wireless access point of claim 11, wherein, to generate the entry in the application server address cache specifying the second forwarding action, the one or more processors are further configured to:
determine the second forwarding action from the policy.

13. A non-transitory computer-readable storage medium storing instructions that when executed, cause one or more programmable processors of a wireless access point to:
receive a first packet for an application provided by an application server;
configure an initial packet flow for the application including a first forwarding action to send traffic for the application to the application server via a tunnel path;
learn the application of the first packet;
generate, based on a policy of the application, an entry in an application server address cache specifying an address of the application server and a second forwarding action to send traffic for the application to the application server via a local breakout path;
receive a second packet for the application;
configure, in response to determining that a destination address of the second packet matches the entry in the application server address cache, a subsequent packet flow for the application including the second forwarding action to send traffic for the application to the application server via the local breakout path;
receive a third packet for the application; and
in response to determining the third packet is associated with the subsequent packet flow, send, based on the second forwarding action, the third packet to the application server via the local breakout path.

14. The non-transitory computer-readable storage medium of claim 13, wherein the instructions further cause one or more programmable processors of the wireless access point to:
receive a fourth packet for the application; and
in response to determining the fourth packet is associated with the initial packet flow, send, based on the first forwarding action, the fourth packet for the application to the application server via the tunnel path.

15. The non-transitory computer-readable storage medium of claim 13, wherein, to learn the application of the first packet, the instructions further cause one or more programmable processors of the wireless access point to:
send the first packet to a deep packet inspection engine; and
receive, from the deep packet inspection engine, classification information of the application.

16. The non-transitory computer-readable storage medium of claim 13, wherein, to generate the entry in the application server address cache specifying the address of the application server, the instructions further cause one or more programmable processors of the wireless access point to:
determine the address of the application server from the destination address of the first packet.

17. The non-transitory computer-readable storage medium of claim 13, wherein the policy comprises:
at least one of the application name and the application identifier; and
the second forwarding action, and
wherein, to generate the entry in the application server address cache specifying the second forwarding action, the instructions further cause one or more programmable processors of the wireless access point to:
determine the second forwarding action from the policy.

* * * * *